July 16, 1963

R. M. LEVY ETAL 3,097,868

PIPE JOINT AND COUPLING THEREFOR

Filed Sept. 3, 1959

Carl de Ganahl
Robert M. Levy

Inventors

By *Ernest V. Haines* Patent Attorney 3,097,868
PIPE JOINT AND COUPLING THEREFOR
Robert M. Levy, Roselle Park, N.J., and Carl de Ganahl, Greenlawn, N.Y.; said Levy assignor to Esso Research and Engineering Company, a corporation of Delaware
Filed Sept. 3, 1959, Ser. No. 837,957
1 Claim. (Cl. 285—95)

The present invention relates to the forming of coupled joints for pipes or tubes and, more particularly, where such tubes are of plastic or compounded materials impregnated with plastic material.

Pipes and tubing comprising essentially plastic materials or plastic materials as impregnants for glass fibers and other synthetic fibers are being used extensively for the handling of liquids and gases, particularly in those cases where ordinary steel or cast iron piping would either be too burdensome as in the case of temporary installations subject to much moving or would be corrosive or unsatisfactory from the standpoint of attack by liquids or gases contained in the pipes and tubing. On the other hand, it has been particularly difficult to effectively join two pipes or tubes of plastic composition. Particularly is this true where pressures are involved and the tendency towards leakage and seepage is presented.

The present invention is directed to the construction of a novel pipe joint and coupling for said joint which is relatively free from leakage both pressurewise and from the seepage standpoint and at the same time is easily assembled and easily disassembled, thus rendering it particularly useful in connection with the use of lightweight plastic pipe for the transportation of crude petroleum, petroleum products, normally gaseous hydrocarbons associated with the transportation of crude petroleum and the refining thereof. Such a joint and coupling is also particularly useful in connection with the use of pipes of relatively large diameter, i.e. of six inch diameter or larger.

The present invention more particularly resides in the formation of a joint between a first and second pipe member in which each of the members has a substantially uniform normal inside and outside diameter and in which an end portion of each pipe member has a special configuration in which one of the pipe members has a uniform internal diameter for a determinate length of a greater than normal width and the other pipe member has a uniform reduced outside diameter for substantially the same determinate length. Additionally, this second pipe member having a smaller than normal outside diameter has a configuration of at least two steps in making up the smaller than normal outside diameter so as to form an inner and an outer external shoulder on said second pipe member end. This configuration of the second pipe member is designed to form a male joint when abutted against the first pipe member of larger than normal internal diameter which may be designated as a female member. The first step reduction of the outside diameter which forms the outer shoulder of the second pipe member is substantially uniform and is slightly less in overall outside diameter than the inside diameter of the first pipe member. The space between the outermost reduced outside diameter of the second pipe member and the enlarged internal diameter of the first pipe member has positioned within it, abutting the ends of the two pipe members, a conventional elastomer sealing ring which is positioned in snug fit against the shouldered form between the first and second steps in forming the inner and outer shoulders of the second pipe member. Regardless of whether the elastomer sealing ring is positioned snugly against the said shoulder once the pipe ends are placed in abutting relationship to one another and when pressure is applied within the pipes, and to the space between the inner shoulders of the coupled pipe members, the pressure will tend to force the elastomer sealing ring against the said outer shoulder thus sealing the joint. This sealing principle is well known but finds unique application in the present novel joint and coupling.

Additionally, each pipe member, as will be seen from the drawings which will be more fully hereinafter described has two circumferential shoulders or collars which are glued or moulded on the pipe ends and which, upon closing the joint, abut one another. For the purpose of closing the joint and locking it permanently in position, two circumferential outer shell halves which are recessed to conform in shape to the collars of the pipe ends are placed over these collars, each shell representing 180° of the circumference of the pipes and collars, so that the outer shells or sleeves fit flush on the pipe collars, and on the pipes. These shells or sleeves serve to hold the coupling together and must be structurally strong enough to withstand the pressures present within the pipes when in use. One or more clamps or other closure members may then be placed around the two shells or sleeves to hold them in place and thus permanently lock the pipe joint. Actual tests of a two inch plastic pipe, which was comprised of resin coated glass fibers spirally wound and impregnated with a commercially available resin of condensed and polymerized Bisphenol-A, propylene oxide and fumaric acid was tested and found to withstand hydraulic pressures of about 8,000 lbs. gauge before failure, no leakage or seepage occurring at the joint. In fact, the joint did not fail at this pressure. The rupture occurred in the pipe proper rather than in the joint.

In order to obtain a fuller understanding of the invention, reference may be had to the accompanying drawings in which.

Figure 1:
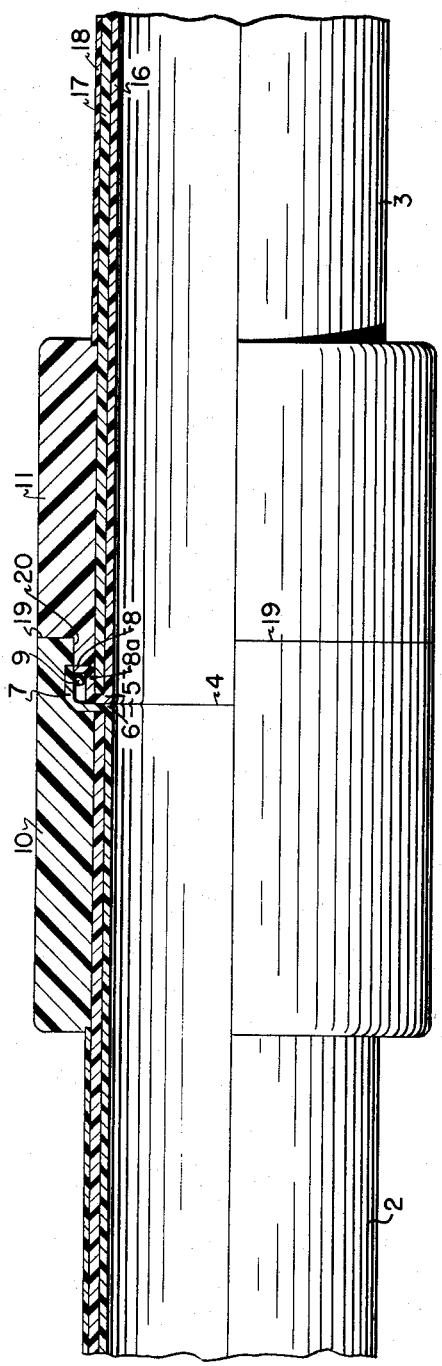
FIGURE 1 illustrates in partial section a portion of a pipe showing the joint between two pipe members and the position of the elastomer sealing ring within the pipe joint.
Figure 2:
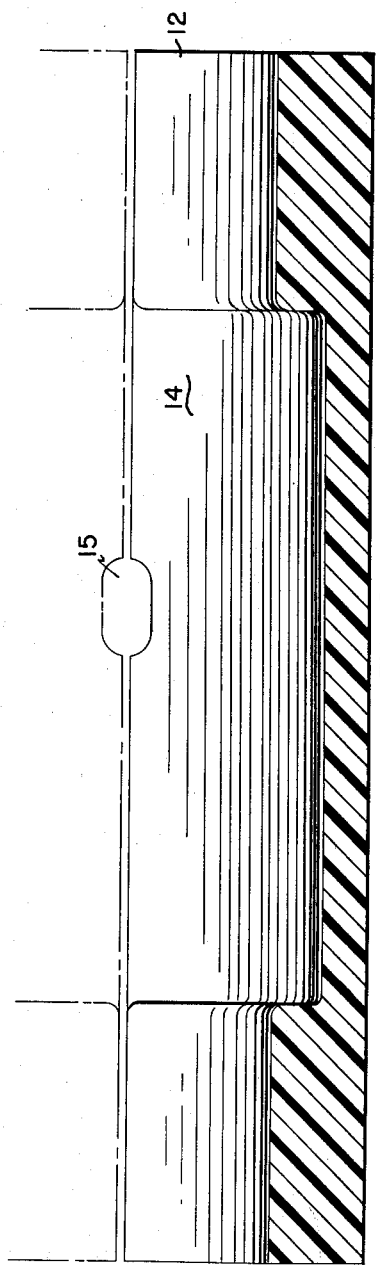
FIGURE 2 is a section showing one outer shell or sleeve which fits over the coupled pipe and locks or secures the joint in coupled condition.

Further in detail, FIGURE 1 shows a pipe joint comprising a female pipe member 2 and a male pipe member 3 with the abutting plane between the members illustrated at 4 and the actual butting planes comprising inner shoulder 5 of the male member and the shoulder 6 of the female member. The greater than normal internal diameter of the female member is bounded by the extremity of the internal diameter designated as 7 and the inner smaller external diameter of the male member is bounded by the plane and surface shown as 8a. The outer shoulder 8 of the male or second pipe member against which sealing O ring 9 is placed or is forced by pressure tends to seal the joint and to prevent leakage of liquids and escape of gases through the space bebtween the surfaces of collar 10 of female pipe member 2 and collar 11 of male pipe member 3. The abutting plane 19 is formed by these two collars which are formed on the pipes 2 and 3 by removing outer resin coating 18 and either gluing on the two collars or molding these plastic collars in situ on the pipe ends.

In order to secure in close proximity to one another the collars 10 and 11 and the butting surfaces 5 and 6 and to insure that the elastomer O-ring 9 may become properly seated and seal the joint, outer shell or sleeve 12 which fits over 180° of the circumference of the joint contains recess 14 which exactly corresponds to the combined length of collars 10 and 11. This sleeve is placed over the joint and a similar locking sleeve covering the other 180° of the joint is placed in opposition to the first sleeve so that the entire joint is secured in firm abutment so far as the pipe member ends are concerned.

These sleeves not only hold the pipe ends in firm contact with each other, but are designed to withstand the pressures present in the pipe upon usage. They may be fabricated of any suitable material of sufficient tensile strength to secure the collars under pressure, but are made of metal such as steel or cast iron or, and more usually, are made up of plastic or hard rubber reinforced with glass rovings. The latter fabrication is generally moulded either to axact size or moulded to enlarged dimensions and then machined down to the required dimensions. In cases where the pipe is to be employed as an underwater pipeline, it is convenient and desirable to make the coupling sleeves of cast iron and, if necessary, to build up the thickness of the sleeve to a greater degree than shown in the drawing so that the extra weight serves as a form of anchor to keep the pipeline, when empty, on the bottom of the river, lake, etc.

Although the drawing illustrates two sleeves, each designed to encompass 180° of the pipe joint circumference, it is sometimes desirable from a practical fabrication standpoint to employ more sleeves, each covering a lesser portion of the joint circumference. For example, four sleeves, each covering 90° of the circumference or six sleeves, each covering 60° of the circumference, etc. may be employed. Indentation 15 in the sleeves illustrated is an optional feature designed for inspection of the joint for leaks during usage. In commercial operation, this feature can be eliminated, particularly where underwater usage is required or in cases where no joint inspection is required or desired.

Clamps or bands (not shown) may then be placed around the sleeves in order to insure that the collars 10 and 11 remain locked in close proximity to one another. In place of clamps the outer shells or sleeves may be bound together by means of pressure sensitive glass reinforced plastic tape or other types of bindings. Conventionally, the elastomer sealing ring 9 is snug and under slight compression between surfaces 7 and 8a within the space shown in FIGURE 1, and the clearance between the interface 20 is not sufficiently large to prevent the elastomer ring 9, when under pressure, from sealing the collars of the respective pipe members. On the other hand, conventional use of O-rings requires that this space between 7 and 8a should not be so small with respect to the diameter of the elastomer sealing ring that the ring cannot move in response to pressure build-up in the pipes while in use, since it is essential that there be some pressure responsive movement of the elastomer ring 9.

In the drawing, the pipe is a multilayered plastic impregnated glass roving material, although the coupling and joint can equally well be composed of other materials and other types of wall construction. The inner layer 16 and the outer layer 18 are composed of polyvinyl chloride or a hard rubber, either of natural or synthetic origin or of mixtures of polyvinyl chloride with a rubber. The inner layer 17 is composed of helically wrapped plastic coated glass rovings incorporated in several layers and finally topped off with similar glass rovings laid parallel to the pipe axis. Any one or more of the resins commerically available and which are thermosetting in nature can be used to coat the glass rovings. The invention is not limited to the particular materials employed, but is directed to the structural configuration of the respective pipe ends and the relative arrangement of the coupling components.

The present invention finds particular utility in the recovery of petroleum products from the field, since, when applied to plastic pipe, it renders itself particularly adaptable to the laying and taking up of temporary pipe lines, plastic being considerably lighter in weight than steel casing or pipe and being through the use of the invention readily assembled and disassembled depending upon the changing requirements for the transportation of oil and gases in the recovery and collection of petroleum from the field. Also, plastic pipe has inherently an insulating property that makes it particularly useful for running materials through it that are required to be at a temperature either considerably above or below atmospheric temperature, i.e. paraffinic base crudes, L.P.G., and the like.

The plastic pipe illustrated in the drawing and previously referred to herein as having a test strength through the novel joint and coupling of about 8000 lbs./sq. in. gauge was manufactured as follows:

A suitable chemically resistant inner layer in semicured state of a mixture of polymerized butadiene, acrylonitrile and synthetic rubber was first formed and then mixed with polyvinyl chloride. This was produced in sheet form which was wrapped around a pipe forming mandrel, helically in two or more layers. Fiberglass rovings were then pressed through a heater, through a resin bath of a reaction product of Bisphenol-A, propylene oxide which was in turn further reacted with fumaric acid, and then excess resin coating removed by a suitable wiping mechanism. The coated rovings were then wound helically over the inner layer in two or more layers, each helix layer being wound in the opposite direction to the one below. Four alternately wound layers in all were wound on. Over this was laid a layer of coated fiberglass rovings, all fibers being in axial alignment and in about equal thickness to the helical wound layers. A final film or layer of the same composition as the inner layer first mentioned is then helically wound around the body of the pipe formation. The pipe is then cured on the mandrel by passing hot air through the mandrel and over the outside or by passing steam through the mandrel and hot air over the outside. After curing for about 0.5 to 1.0 hour at about 300° F., the mandrel is withdrawn and the finished pipe is then ready for application of the male and female members of the joint. As previously stated, these are usually glued or moulded on after first removing sufficient of the outer layer or film to accommodate the collars. The sleeves or outer coupling shells are made of fiberglass cloth impregnated with the resin employed for forming the inner layers of the pipe or some other suitable resin imparting high tensile strength in cured and finished condition. The sleeves are then machined to size and banded or wrapped to hold them in position. Plastic pipe made by other means and with other materials may also be employed. An excellent general description of presently employed methods of producing plastic pipe is to be found in Morgan "Glass Reinforced Plastics," Hiffe and Sons, Ltd. (1954) particularly pages 117–133.

Having now thus fully described and illustrated the character of the invention, what is desired to be secured by the Letters Patent is:

What is claimed is:

A pipe joint between a first pipe member and a second pipe member abutting in axial alignment wherein said pipe members are of substantially equal internal diameters and wherein said pipe members are of plastic composition, the joint which comprises in combination:

I. a female collar of enlarged external diameter firmly attached to an outer surface of said first pipe member,
  (a) said female collar extending from the plane of abutment of said first and second pipe members axially along said first pipe member a substantial predetermined distance,
  (b) said female collar extending radially outward in the plane of abutment of said pipe members to an enlarged internal diameter, thereby forming a first female shoulder; then extending axially in the direction of said second pipe member a predetermined distance, thereby forming an inwardly directed surface of enlarged internal diameter; and then extending radially outward a distance coincident with said enlarged external diameter, thereby forming a second female shoulder lying in a radial plane, II. a male collar of enlarged external diameter firmly attached to an outer surface of said second pipe member,
  (a) said male collar extending from a point spaced axially from the plane of abutment of said first and second pipe members axially along said second pipe member a substantial predetermined distance,
  (b) said male collar extending radially outward from said point a distance substantially equal to said enlarged internal diameter of said female collar, thereby forming a first male shoulder lying in a radial plane; then extending axially away from said plane of abutment of said first and second pipe members a predetermined distance, thereby forming an outwardly directed surface abutting a portion of said inwardly directed surface of said female collar; then extending radially outward a distance coincident with said enlarged external diameter, thereby forming a second male shoulder in abutment with said second female shoulder, said second male shoulder lying in a radial plane,
III. an O ring seal of substantially round cross section fitting between said first female shoulder and said first male shoulder and limited in axial movement thereby, said O ring seal being in contact with the outer surface of said second pipe member and in contact with said inwardly directed surface of said female collar and
IV. clamping means in the form of circumferential sleeves enclosing said female collar and said male collar and having radial abutting surfaces to prevent axial separation thereof.

References Cited in the file of this patent

UNITED STATES PATENTS

| | | |
|---|---|---|
| 320,683 | Phillis | June 23, 1885 |
| 478,496 | Aird | July 5, 1892 |
| 1,851,574 | Fiederlein | Mar. 29, 1932 |
| 1,887,332 | Shrum | Nov. 8, 1932 |
| 2,542,701 | Press | Feb. 20, 1951 |
| 2,726,104 | Boitnott et al. | Dec. 6, 1955 |
| 2,880,019 | Wurtz | Mar. 31, 1959 |

FOREIGN PATENTS

| | | |
|---|---|---|
| 768,162 | France | May 14, 1934 |